United States Patent

Nakakawaji et al.

Patent Number: 5,985,403
Date of Patent: Nov. 16, 1999

[54] MAGNETIC RECORDING MEDIUM AND MAGNETIC RECORDING REPRODUCER

[75] Inventors: Takayuki Nakakawaji, Hitachi; Mitsuyoshi Shoji, Ibaraki-ken; Tomoe Takamura; Shuji Imazeki, both of Hitachi; Yutaka Ito, Takahagi; Hisashi Morooka, Hitachi; Yuko Murakami; Juichi Arai, both of Ibaraki-ken, all of Japan

[73] Assignee: Hitachi, Ltd., Tokyo, Japan

[21] Appl. No.: 08/214,551

[22] Filed: Mar. 18, 1994

[30] Foreign Application Priority Data

Mar. 18, 1993 [JP] Japan .................................. 5-058367

[51] Int. Cl.$^6$ ....................................................... G11B 5/66
[52] U.S. Cl. ..................... 428/65.3; 428/65.4; 428/65.8; 428/695; 428/694 TP; 428/694 TF; 428/694 BP; 428/694 BF; 428/704; 428/421; 428/900; 360/86; 360/128; 360/135
[58] Field of Search ..................... 428/694 TP, 694 TF, 428/694 BP, 694 BF, 685, 704, 900, 421, 65.3, 65.4, 65.8; 360/86, 128, 135

[56] References Cited

U.S. PATENT DOCUMENTS

| | | | |
|---|---|---|---|
| 2,969,435 | 1/1961 | Lynott | 360/103 |
| 3,579,212 | 5/1971 | Gabor | 360/103 |
| 4,120,995 | 10/1978 | Phipps | 427/255.1 |
| 4,430,239 | 2/1984 | Wyman | 252/62.51 R |
| 5,061,562 | 10/1991 | Yamanaka | 478/408 |
| 5,219,651 | 6/1993 | Shoji et al. | 428/323 |

FOREIGN PATENT DOCUMENTS

| | | | |
|---|---|---|---|
| 367510 | 10/1989 | European Pat. Off. | |
| 0523843 | 1/1993 | European Pat. Off. | G11B 17/132 |
| 54-36171 | 7/1979 | Japan | |
| 60-101717 | 5/1985 | Japan | |
| 61-178719 | 8/1986 | Japan | |
| 63-308775 | 12/1988 | Japan | |
| 2-27521 | 1/1990 | Japan | |
| 2-130789 | 5/1990 | Japan | |
| 2-249177 | 10/1990 | Japan | |
| 2-260111 | 10/1990 | Japan | |
| 3-119580 | 5/1991 | Japan | |
| 3-241524 | 10/1991 | Japan | |
| 3-252921 | 12/1991 | Japan | |
| 4-123315 | 4/1992 | Japan | |
| 4-205814 | 7/1992 | Japan | |
| 4-328321 | 11/1992 | Japan | |
| 5-159532 | 6/1993 | Japan | |

OTHER PUBLICATIONS

Database, WPI, Derwent Publ. Ltd. London, GB; & JP 1–1 290 117 Hitachi KK Nov. 22, 1989–Abstract Only.

Primary Examiner—Leszek Kiliman
Attorney, Agent, or Firm—Antonelli, Terry, Stout & Kraus, LLP

[57] ABSTRACT

A magnetic recording medium comprising a non-magnetic substrate and a magnetic layer and a protective layer which are formed on the non-magnetic substrate in that order, wherein a substance(s) as a single component or a plurality of components, which constitute a liquid continuously supplied to the surface of said protective layer, are adsorbed on or react with the surface of said protective layer to form a lubricating film having low frictional properties and low wearing-out properties. The present invention can realize negligible friction and wear resistance even in severe sliding at a very slightly kept-off or completely contacted state by continuous supply of a liquid lubricant prepared by adding a fluoro compound and an extreme pressure agent or an oiliness agent to a solvent to the surface of a disc, and can provide a magnetic recording reproducer having excellent sliding-resistant characteristics.

36 Claims, 5 Drawing Sheets

MAGNETIC RECORDING MEDIUM AND MAGNETIC RECORDING REPRODUCER

BACKGROUND OF THE INVENTION

The present invention provides a magnetic recording medium and a magnetic recording reproducer which are excellent in sliding durability, and it can be widely utilized as a technique for lubricating sliding portions in general industrial machines.

Magnetic media are most generally used as information regenerators and are widespread in the fields of not only large computers but also small personal computers, word processors and the like. Therefore, the storage capacity of the magnetic media is increased year by year, and with this increase, a remarkable technical innovation has been made. Particularly in hard-type magnetic disc units requiring high packing density and high-speed writing, among magnetic recorders, thin film magnetic recording media capable of having a high packing density have been used in recent years. In the magnetic discs, the distance between a head and a disc tends to be reduced for increasing the storage capacity, and now the distance from the head is as short as about 0.1 $\mu$m. Therefore, the probability of contact sliding of the head and the disc on each other is high not only during suspension of operation but also during operation of the disc. For this reason and the like, sliding conditions becomes severe unavoidably and hence sliding durability of the disc is absolutely necessary for improving the reliability of the magnetic disc units.

Now, the lubricating layers of most magnetic recording media are formed of fluoro compounds, and large number of attempts have been made to improve the sliding durability. For example, methods comprising coating with or chemical fixing of fluorine-containing lubricants capable of being easily adsorbed have been proposed in U.S. Pat. No. 4,120,995, Japanese Patent Unexamined Publication Nos. 54-36171, 59-172159, 59-203239, 60-38730, 60-109028, 60-101717, 60-101715, 60-242518, 60-202533, 60-246020, 61-39919, 61-104318, 62-42316, 63-225918 and 63-220420, etc. The fluorine-containing lubricants described in these references are silane-based and phosphoric acid-based lubricants which react with the surface of an inorganic thin protective layer on the magnetic layer of a thin film magnetic recording medium to adhere to the surface. In addition, methods for improving the sliding durability by forming a lubricating film consisting of a plurality of components on the surface of a disc have been proposed in Japanese Patent Unexamined Publication Nos. 62-257622, 62-257623, 2-175791, 2-240828, 2-249130, 3-34121 and 4-48435. Furthermore, methods comprising forming a lubricating film on a magnetic head slider in a contact portion with the surface of a disc have been proposed in Japanese Patent Unexamined Publication Nos. 62-188012, 62-231411, 62-34392, 63-48674, 63-117379, 63-269384, 63-276769, 1-137484 and 3-88189, etc. These techniques are suitable for the keeping-off of a head by the use of an air film, which is employed in present-day magnetic recorders.

However, the distance from a head tends to be reduced more and more in future, and it is considered that in the near future, the distance from a head will be of the order of nanometer or will become such that complete contact occurs. In such a range corresponding to keeping-off at a very short distance or contact sliding, a sufficient reliability on resistance to sliding cannot be realized by the above-mentioned conventional lubricating methods. Therefore, a lubricating layer formed on the outermost surface of a magnetic recording medium is required to have performance characteristics sufficient to withstand severe sliding conditions. In addition, magnetic recording media to be subjected to contact sliding, such as magnetic tapes should also be improved in sliding durability.

In these circumstances, methods in which a head is kept off using a thin liquid film have been proposed as techniques for lubrication in a range corresponding to keeping-off at a very short distance or at a completely contacted state, in U.S. Pat. Nos. 2,969,435 and 3,579,212, and Japanese Patent Unexamined Publication Nos. 63-308775, 2-249177, 2-130789 and 3-119580. The above invention in which a head is kept off by inserting a liquid film permits relatively stable keeping-off of the head even in the range corresponding to keeping-off at a very short distance, because the liquid film has a higher rigidity than does an air film. However, even when these techniques are employed for maintaining the reliability on sliding, contact sliding of a disc and the head on each other promotes the wear of the disc unless the liquid film for keeping-off the head has a high sliding durability in itself. Therefore, for coping with the above-mentioned severe sliding, it is necessary to impart functions such as high wear resistance and low frictional properties to the liquid film. But, there is no effective means for the impartment.

When recording and reading out are carried out while a head is kept off at a very short distance or is in complete contact with a disc, the head and the disc are brought into a severe sliding state because the contact sliding time is increased as compared with conventional sliding. Under such severe sliding conditions, the peeling-off of a lubricating film results in an accelerated increase of the wear of the disc. Even when the lubricating film is tightly fixed to the surface of a protective film by chemical bonding or the like, the peeling-off by sliding is not avoidable, so that the wear occurs intermittently. That is, even when the conventional method comprising forming a thin lubricating film of a fluoro compound on the surface of a disc which has been proposed in the above U.S. Pat. No. 4,120,995 and the like, is applied to keeping-off at a very short distance or complete contact sliding, the peeling-off by sliding of the lubricating film is not avoidable, so that the wear proceeds intermittently.

For preventing the wear of a disc during keeping-off at a very short distance or complete contact sliding, friction and wear should be kept slight by preventing always solid-solid contact between the sliding surface of a magnetic head slider and the surfaces of a protective film and a magnetic film. That is, recording and reading out can be maintained while keeping the friction between a head and the disc slight without their wear, when a lubricant having low frictional properties and an excellent wear resistance is used in the form of a lubricating film and the lubricating film is such that when a part of the lubricating film is peeled off by sliding, the lubricating film is repaired at once in the sliding portion.

The keeping-off methods using a thin liquid film which have been proposed in U.S. Pat. Nos. 2,969,435 and 3,579,212 and Japanese Patent Unexamined Publication Nos. 63-308775, 2-249177, 2-130789 and 3-119580 are considered effective as methods for repairing the peeled portion of a lubricating layer (a liquid film) because the liquid film always coats the sliding surface by continuous supply of liquid. However, when sliding is caused by contact between solids, the repair of the lubricating layer (the liquid film) by the supply of the liquid cannot prevent the occurrence and progress of wear unless the liquid used has a low viscosity for realizing keeping-off at a very short distance and the liquid supplied itself has satisfactory lubricating characteristics.

That is, as a lubricating method for keeping-off at a very short distance or complete contact sliding, the keeping-off methods using a liquid film, not to mention conventional methods comprising forming a thin lubricating film of a fluoro compound, are not sufficient. A problem to be solved by the present invention is to achieve impartment of ability to repair a lubricating film and a high sliding durability of the lubricating film itself, which is a problem in keeping-off at a very short distance or complete contact sliding. In detail, the problem to be solved by the present invention is to provide a magnetic recording medium and a magnetic recording reproducer which have been freed of problems in prior arts by a means for continuous supply of a liquid having a low viscosity, an excellent wear resistance and low frictional characteristics to sliding portions.

SUMMARY OF THE INVENTION

The present invention is accomplished by employing the following means for solving the problem of imparting ability to repair a lubricant and a high sliding durability of a lubricating film itself in keeping-off at a very short distance or complete contact sliding.

Explanation of the symbols

1 —magnetic disc, 2 —spherical slide, 3 —continuously supplied liquid lubricant, 4 —spindle, 5 —gimbal, 6 —magnetic-disc presser foot, 7 —fixing screw, 8 —spherical-slide holder.

Detailed Description of the Invention

The 1st aspect of the present invention is a magnetic recording medium comprising a non-magnetic substrate and a magnetic layer and a protective layer which are formed on the non-magnetic substrate in that order, said protective layer having on its surface a lubricating film formed by continuous supply of a liquid substance capable of imparting low frictional properties and low wearing-out properties, to the surface of said protective layer and its adsorption on or reaction with the surface of said protective film.

The 2nd aspect is a magnetic recording reproducer comprising a magnetic recording medium comprising a non-magnetic substrate and a magnetic layer and a protective layer which are formed on the non-magnetic substrate in that order, said protective layer having on its surface a lubricating film formed by continuous supply of a liquid substance capable of imparting low frictional properties and low wearing-out properties, to the surface of said protective layer and its adsorption on or reaction with the surface of said protective film; and a magnetic head.

The 3rd aspect is a magnetic recording medium comprising a non-magnetic substrate and a magnetic layer and a protective layer which are formed on the non-magnetic substrate in that order, said protective layer having on its surface a lubricating layer formed by continuous supply of a lubricant comprising a fluorine-containing portion and a fluorine-free portion, to the surface of said protective layer.

The 4th aspect is a magnetic recording reproducer comprising a magnetic recording medium comprising a non-magnetic substrate and a magnetic layer and a protective layer which are formed on the non-magnetic substrate in that order, said protective layer having on its surface a lubricating layer formed by continuous supply of a lubricant comprising a fluorine-containing portion and a fluorine-free portion, to the surface of said protective layer; and a magnetic head.

The 5th aspect is a magnetic recording medium comprising a non-magnetic substrate and a magnetic layer and a protective layer which are formed on the non-magnetic substrate in that order, said protective layer having on its surface a lubricating layer formed by continuous supply of a lubricant comprising two components, i.e., a fluoro compound comprising a fluorine-containing portion and a fluorine-free portion, and a low-viscosity solvent capable of dissolving said fluoro compound, to the surface of said protective layer.

The 6th aspect is a magnetic recording reproducer comprising a magnetic recording medium comprising a non-magnetic substrate and a magnetic layer and a protective layer which are formed on the non-magnetic substrate in that order, said protective layer having on its surface a lubricating layer formed by continuous supply of a lubricant comprising two components, i.e., a fluoro compound comprising a fluorine-containing portion and a fluorine-free portion, and a low-viscosity solvent capable of dissolving said fluoro compound, to the surface of said protective layer; and a magnetic head.

The 7th aspect is a magnetic recording medium comprising a non-magnetic substrate and a magnetic layer and a protective layer which are formed on the non-magnetic substrate in that order, said protective layer having on its surface a lubricating layer formed by continuous supply of a lubricant comprising two components, i.e., a fluoro compound comprising a fluorine-containing portion and a fluorine-free portion, and either an extreme pressure agent or an oiliness agent, to the surface of said protective layer.

The 8th aspect is a magnetic recording reproducer comprising a magnetic recording medium comprising a non-magnetic substrate and a magnetic layer and a protective layer which are formed on the non-magnetic substrate in that order, said protective layer having on its surface a lubricating layer formed by continuous supply of a lubricant comprising two components, i.e., a fluoro compound comprising a fluorine-containing portion and a fluorine-free portion, and either an extreme pressure agent or an oiliness agent, to the surface of said protective layer; and a magnetic head.

The 9th aspect is a magnetic recording medium comprising a non-magnetic substrate and a magnetic layer and a protective layer which are formed on the non-magnetic substrate in that order, said protective layer having on its surface a lubricating layer formed by continuous supply of a lubricant comprising two components, i.e., either an extreme pressure agent or an oiliness agent, and a low-viscosity solvent capable of dissolving the extreme pressure agent or the oiliness agent, to the surface of said protective layer.

The 10th aspect is a magnetic recording reproducer comprising a magnetic recording medium comprising a non-magnetic substrate and a magnetic layer and a protective layer which are formed on the non-magnetic substrate in that order, said protective layer having on its surface a lubricating layer formed by continuous supply of a lubricant comprising two components, i.e., either an extreme pressure agent or an oiliness agent, and a low-viscosity solvent capable of dissolving the extreme pressure agent or the oiliness agent, to the surface of said protective layer; and a magnetic head.

The 11th aspect is a magnetic recording medium comprising a non-magnetic substrate and a magnetic layer and a protective layer which are formed on the non-magnetic substrate in that order, said protective layer having on its surface a lubricating layer formed by continuous supply of a lubricant comprising three components, i.e., a fluoro compound comprising a fluorine-containing portion and a fluorine-free portion, either an extreme pressure agent or an oiliness agent, and a low-viscosity solvent capable of dissolving said fluoro compound and the extreme pressure agent or the oiliness agent, to the surface of said protective layer.

The 12th aspect is a magnetic recording reproducer comprising a magnetic recording medium comprising a non-magnetic substrate and a magnetic layer and a protective layer which are formed on the non-magnetic substrate in that order, said protective layer having on its surface a lubricating layer formed by continuous supply of a lubricant comprising three components, i.e., a fluoro compound comprising a fluorine-containing portion and a fluorine-free portion, either an extreme pressure agent or an oiliness agent, and a low-viscosity solvent capable of dissolving said fluoro compound and the extreme pressure agent or the oiliness agent, to the surface of said protective layer; and a magnetic head.

When the present invention is applied to a magnetic recorder in which recording and reading out are carried out at a very slightly kept-off or completely contacted state, a liquid continuously supplied to the surface of a disc forms a thin liquid film on the disc surface. When a head and the disc are subjected to contact sliding, a fluoro compound dissolved in the liquid film exhibits low frictional properties and corrosion resistance because of its characteristic, i.e., a low surface energy, and either an extreme pressure agent or an oiliness agent which is similarly dissolved in the liquid film reacts with the sliding surface to form a boundary lubrication oil film and prevent the progress of wear, when slight wear is caused. Furthermore, in the present invention, a liquid containing the fluoro compound and/or either the extreme pressure agent or the oiliness agent is continuously supplied to the disc surface, so that even if the boundary lubrication oil film or the fluoro compound adsorbed on the surface is removed by sliding, repairing effect on the sliding portion is brought about at once, whereby the head and the disc can carry out recording and reading out in a constant sliding state without wear.

In the present invention, the fluoro compound is one which contains a perfluoropolyoxyalkyl group or a perfluoropolyoxyalkylene group, and it includes, for example, $F(CF(CF_3)CF_2-O-)x-C_2F_4-$ $F(C_3F_6-O-)x-(CF_2O)y-(CF_2)z-$ $-(CF_2O)x-(C_2F_4O)y-(C_3F_6O)_3-CF_2-$ wherein x is an integer of 2 to 50, y is an integer of 2 to 50 and z is an integer of 2 to 50, but the present invention is not limited by them.

In this case, specific examples of lubricant formed by linking of a perfluoropolyoxyalkylene group and a hydrocarbon group to each other are

$Rf-COOH$ $Rf-CONH-C_3H_6-Si(OC_2H_5)_3$ (5)

(6)

$Rf-COOC_2H_4-Si(OCH_3)_3$ $(C_2H_5O)_3Si-C_3H_6-HNOC-Rf-CONH-C_3H_6-Si(OC_2H_5)_3$

$(C_2H_5O)_3Si-O-CH_2-Rf-CH_2-O-Si(OH_2H_5)_3$ $(CH_3O)_3Si-OOC-Rf-COO-Si(OCH_3)_3$ $(CH_3O)_3-Si-C_3H_6-NHCO-Rf-CONH-C_3H_6-Si-(OCH_3)_3$ $(C_2H_5O)_3-Si-C_3H_6-NHCO-Rf-CONH-C_3H_6-Si-(OC_2H_5)_2$

(7)

(8)

$Rf-COO^-NH_4^+$ (9)

(10)

wherein Rf is a perfluoropolyoxyalkyl group or a perfluoropolyoxyalkylene group, but the present invention is not limited by them.

In addition, as the extreme pressure agent in the present invention, phosphorus-containing extreme pressure agents are preferable from the viewpoint of corrosion of the magnetic recording medium and compatibility with a solvent capable of dissolving the fluoro compound. Specific examples of the extreme pressure agent are $(C_6H_5O)_3P$
$(CH_3C_6H_4O)_3P$
$(n\text{-}C_9H_{19}C_6H_4O)_3P$
$(C_6H_5O)_2(C_9H_{19}C_6H_4O)P$
$(n\text{-}C_4H_9O)_3P$
$(n\text{-}C_{12}H_{25}O)_3P$
$(C_6H_5O)_2P(O)H$
$(C_6H_5O)_3P(O)$
$(CH_3C_6H_4O)_3P(O)$
$(n\text{-}C_8H_{17}O)_3P(O)$ The oiliness agent according to the present invention includes, for example, $CH_3(CH_2)_6COOH$
$CH_3(CH_2)_8COOH$
$CH_3(CH_2)_{10}COOH$
$CH_3(CH_2)_{14}COOH$
$CH_3(CH_2)_{16}COOH$ $$CH_3(CH_2)_3\underset{\underset{CH_2CH_3}{|}}{C}HOOC(CH_2)_8COO\underset{\underset{CH_2CH_3}{|}}{C}H(CH_2)_3CH_3 \quad (11)$$

but the present invention is not limited by them.

A means for supplying continuously to the surface of a disc a liquid prepared by dissolving the fluoro compound and either the extreme pressure agent or the oiliness agent in a solvent, forms a boundary lubrication oil film of the extreme pressure agent or the oiliness agent not only on the recording medium but also on the sliding surface of a slider and can realize an excellent wear resistance and low frictional characteristics by virtue of the synergistic effect of the formation of the boundary lubrication oil film and low frictional properties and wearing-out properties due to the low surface energy of the fluoro compound. By virtue of this effect, there can be provided magnetic recorder in which keeping-off at a very short distance or complete contact sliding is conducted.

Description of the Preferred Embodiment

The effects of the present invention are described be low in detail in examples, but the present invention is not limited by the examples.

Example 1

Fluoro compound (I) of the following structural formula was prepared.
Fluoro compound (I):

$$F(CF_2CF_2CF_2\text{—}O)_{22}C_2F_4\text{—}COOH$$

Then, there was obtained magnetic disc base plate 1 composed an Al alloy disc of 5.25 inches, a Ni—P layer formed on the surface of the Al alloy disc, a Cr layer formed on the Ni—P layer, a magnetic layer formed by sputtering Ni—Co on the Cr layer to a thickness of 50 nm, and a carbon sputtered layer of about 40 nm formed on the magnetic layer.

In addition, there was obtained spherical slide 1 made of TiC—$Al_2O_3$ ceramic which had a spherical surface of R30.

Figure 1:
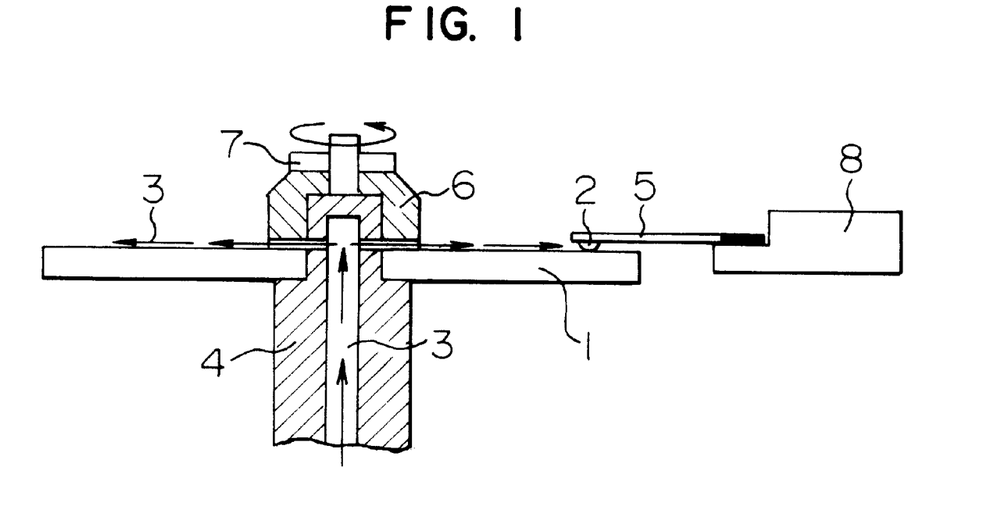
FIG. 1 shows a cross section of a friction tester capable of supplying a liquid lubricant continuously to the surface of a magnetic disc.

The thus obtained base plate 1 and spherical slide 1 were set in the sliding tester shown in FIG. 1. The tester shown in FIG. 1 has a structure which enables a liquid introduced into a spindle, to be supplied continuously to the surface of base plate 1 by centrifugal force due to the rotation of the spindle. As to the test conditions, the depth of wear of the disc by operation at a sliding rate of 10 m/s and a pressing load of the spherical slide of 10 g for 3 hours was measured. The test result is shown in Table 1.

TABLE 1

| | Lubricant tested | Maximum depth of wear, nm |
|---|---|---|
| Example 1 | Fluoro compound (I) $F(CF_2CF_2CF_2\text{—}O)_{22}C_2F_4\text{—}COOH$ | 3.07 |
| Comparative Example 1 | Fluorine-containing lubricant trichloro-trifluoroethane | 63.7 |

The result indicates that in the present example in which fluoro compound (I) was used, the depth of wear was smaller than in the hereinafter described case where a liquid composed of a perfluorocarbon type solvent (FC 72, a trade name, Sumitomo 3M Ltd.) alone was used (Comparative Example 1).

Example 2

Solutions (a) were prepared by dissolving the same fluoro compound (I) used in Example 1 in a perfluorocarbon type solvent (PC 75, a trade name, Sumitomo 3M Ltd.) to various concentrations by weight of 0.001 to 0.1 wt %.

Then, there was obtained magnetic disc base plate 2 composed of an Al alloy disc of 3.5 inches, a Ni—P layer formed on the surface of the Al alloy disc, a Cr layer formed on the Ni—P layer, a magnetic layer formed by sputtering Co—Cr—Ta on the Cr layer to a thickness of 50 nm, and a carbon sputtered layer of about 30 nm formed on the magnetic layer.

In addition, there was obtained spherical slide 2 made of TiC—$Al_2O_3$ ceramic which had a spherical surface of R30.

Figure 2:
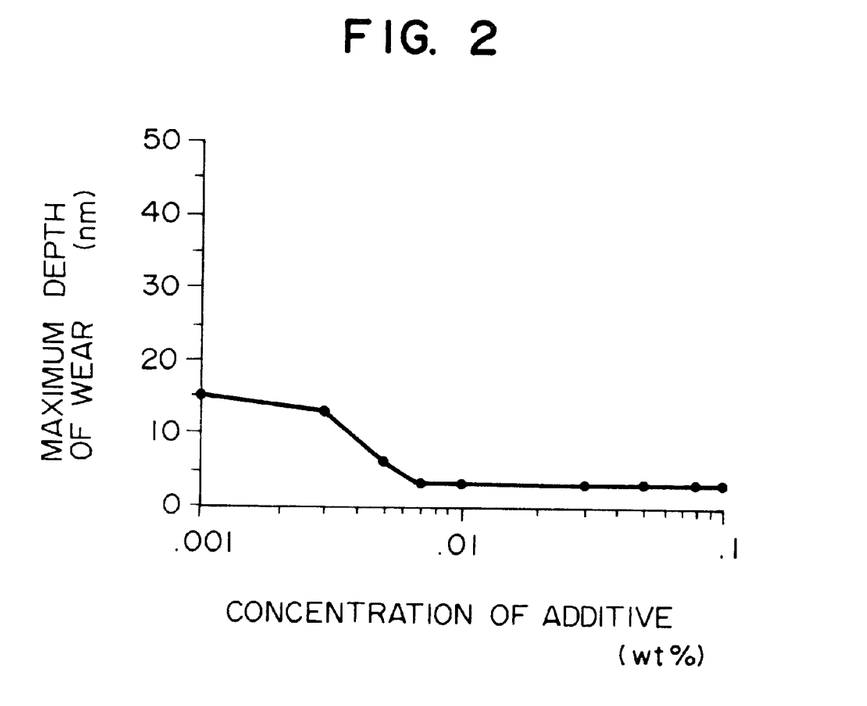
FIG. 2 shows the results of a test for friction at each concentration of the fluoro compound added in Example 2 to a fluorine-containing solvent.

The thus obtained base plate 2 and spherical slide 2 were set in the same sliding tester as described in Example 1, and the depth of wear of the disc was measured at the various concentrations of the fluoro compound added under the same test conditions as described in Example 1. The test results are shown in FIG. 2. These results indicate that in the present example in which fluoro compound (I) was added, the depth of wear was smaller than in the hereinafter described cases, i.e., the case where a fluorine-containing solvent containing no fluoro compound was used alone (Comparative Example 1), and the case where a nonpolar fluorocarbon oil was added (Comparative Example 2). In addition, when the concentration of the fluoro compound added was 0.001 wt % to 0.007 wt %, the depth of wear was decreased with an increase of the concentration. When the concentration was 0.007 wt % or more, the depth of wear was not markedly changed.

Example 3

Solutions (b) were prepared by dissolving phosphorus-containing extreme pressure agent (II) of the following structural formula in a perfluorocarbon type solvent (FC 72, a trade name, Sumitomo 3M Ltd.) to various concentrations by weight of 0.001 to 0.1 wt %.

Phosphorus-containing extreme pressure agent (II):

$(C_6H_5O)_3P$

Then, magnetic disc base plate 3 was obtained by forming a Ni—P layer, a Cr layer, a Co—Cr—Pt magnetic layer of 50 nm and a carbon sputtered layer of about 35 nm in that order on the surface of an Al alloy disc of 2.5 inches.

In addition, there was obtained spherical slide 3 made of TiC—Al$_2$O$_3$ ceramic which had a spherical surface of R30.

Figure 3:
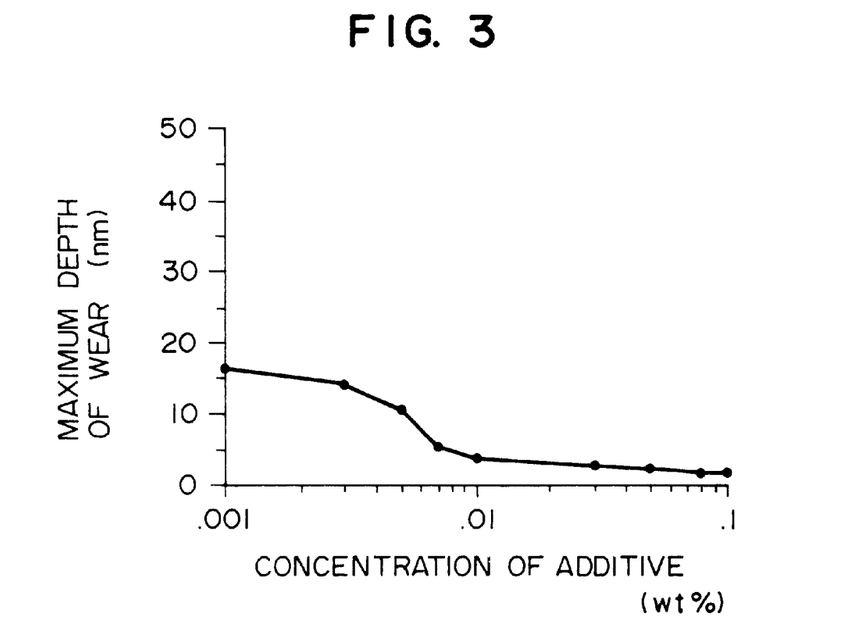
FIG. 3 shows the results of a test for friction at each concentration of the phosphorus-containing extreme pressure agent added in Example 3 to a fluorine-containing solvent.

Using the thus obtained base plate 3 and spherical slide 3, the same sliding test as described in Example 1 was carried out. The results of measuring the depth of wear of the disc at the various concentrations of phosphorus-containing extreme pressure agent (II) added are shown in FIG. 3. These results indicate that hereinafter, in the present example in which phosphorus-containing extreme pressure agent (II) was added, the depth of wear was smaller than in the case where a perfluorocarbon type solvent (FC 72, a trade name, Sumitomo 3M Ltd.) was used alone (Comparative Example 1).

Example 4

Solutions (C) were prepared by dissolving fluoro compound (III) and phosphorus-containing extreme pressure agent (IV) which are represented by the structural formulas shown below, in a perfluoro carbon type solvent (FC 77, a trade name, Sumitomo 3M Ltd.) to a concentration by weight of 0.05 wt % and various concentrations by weight of 0.001 to 0.1 wt %, respectively.

Fluoro compound (III):

$F(CF_2CF_2CF_2—O)_{22}C_2F_4—COO^-NH_3^+$

Phosphorus-containing extreme pressure agent (IV):

$(CH_3C_6H_4O_3)_3P$

Then, magnetic disc base plate 4 was obtained by forming a Ni—P layer, a Cr layer, a Co—Cr—Pt magnetic layer of 40 nm and a carbon sputtered layer of 20 nm in that order on the surface of a glass disc of 2.5 inches.

In addition, there was obtained spherical slide 4 made of TiC—Al$_2$O$_3$ ceramic which had a spherical surface of R30.

Figure 4:
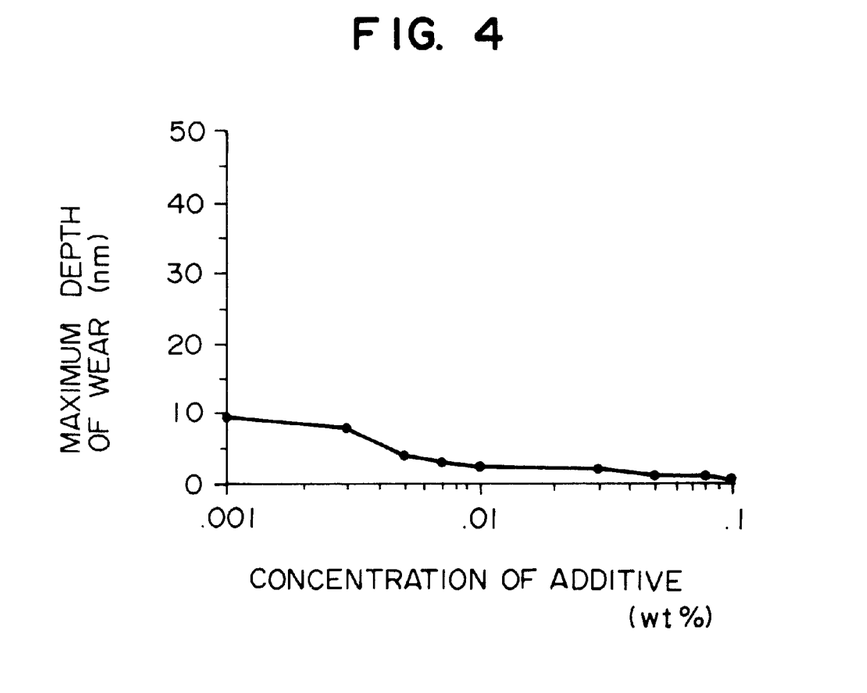
FIG. 4 shows the results of a test for friction at each concentration of the phosphorus-containing extreme pressure agent added in Example 4 to a fluorine-containing solvent to which a fluoro compound was also added to adjust its concentration to 0.05 wt %.

Using the thus obtained base plate 4 and spherical slide 4, the depth of wear of the disc was measured at the various concentrations of phosphorus-containing extreme pressure agent (IV) added with the same tester under the same test conditions as described in Example 1. The results are shown in FIG. 4. Hereinafter, the reducing effect of the addition of the phosphorus-containing extreme pressure agent on the depth of wear was confirmed by comparison with the case where a solution prepared by adding a nonpolar fluorocarbon oil to a perfluorocarbon type solvent (FC 72, a trade name) was used (Comparative Example 2).

Example 5

Solutions (d) were prepared by dissolving fluoro compound (V) and phosphorus-containing extreme pressure agent (VI) which are represented by the structural formulas shown below, in a perfluoro carbon type solvent (FC 77, a trade name, Sumitomo 3M Ltd.) to a concentration by weight of 0.05 wt % and various concentrations by weight of 0.001 to 0.1 wt %, respectively.

Fluoro compound (V):

$F(CF_2CF_2CF_2—O)_{22}C_2F_4—COO^-NH_4^+$

Phosphorus-containing extreme pressure agent (VI):

$(C_{10}H_{21}O)_2PHO$

Then, magnetic disc base plate 5 was obtained by forming a Ni—P layer, a Cr layer, a Co—Cr—Ta magnetic layer of 50 nm and a carbon sputtered layer of 20 nm in that order on the surface of an Al alloy disc of 1.8 inches.

In addition, there was obtained spherical slide 5 made of TiC—Al$_2$O$_3$ ceramic which had a spherical surface of R30.

Figure 5:
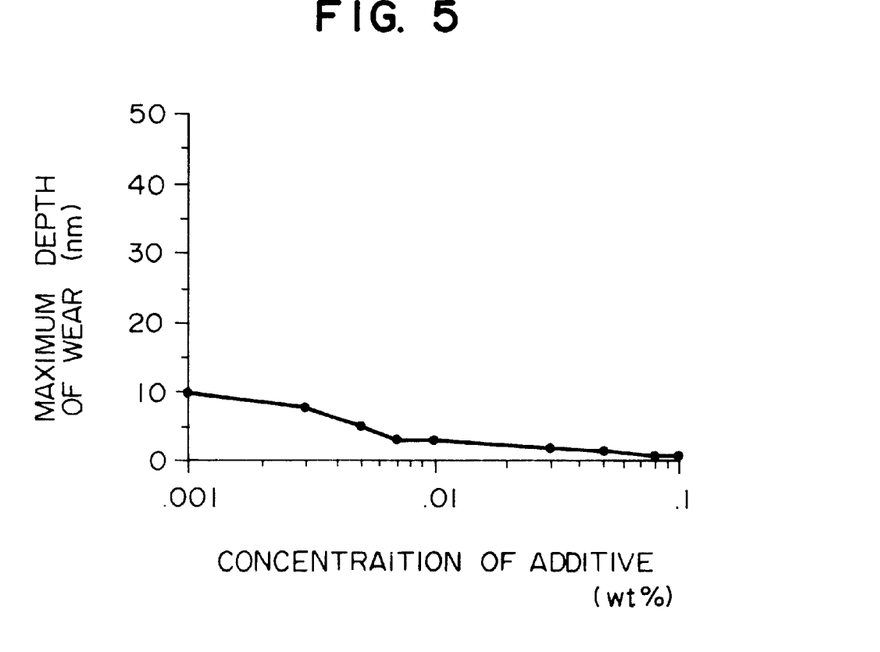
FIG. 5 shows the results of a test for friction at each concentration of the phosphorus-containing extreme pressure agent added in Example 5 to a fluorine-containing solvent to which a fluoro compound was also added to adjust its concentration to 0.05 wt %.

Using the thus obtained base plate 5 and spherical slide 5, the depth of wear of the disc was measured at the various concentrations of phosphorus-containing extreme pressure agent (IV) added with the same tester under the same test conditions as described in Example 1. The results are shown in FIG. 5. As in Example 4, the reducing effect of the addition of the phosphorus-containing extreme pressure agent on the depth of wear was confirmed by comparison with Comparative Example 2.

Example 6

Solutions (e) were prepared by dissolving fluoro compound (VII) and phosphorus-containing extreme pressure agent (VIII) which are represented by the structural formulas shown below, in a perfluoro carbon type solvent (FC 75, a trade name, Sumitomo 3M Ltd.) to a concentration by weight of 0.01 wt % and various concentrations by weight of 0.001 to 0.1 wt %, respectively.

Fluoro compound (VII):

$F(CF_2CF_2CF_2—O)_{22}C_2C_4—COO^-NH_3^+$ $—NH_3^+O^-OC—C_2F_4(O—CF_2CF_2CF_2)_{22}F$

Phosphorus-containing extreme pressure agent (VIII):

$(C_{12}H_{25}O)_2PHO$

Then, magnetic disc base plate 6 was obtained by forming a Ni—P layer, a Cr layer, a Co—Cr—Pt magnetic layer of 40 nm and a carbon sputtered layer of 30 nm in that order on the surface of a glass disc of 1.8 inches.

In addition, there was obtained spherical slide 6 made of TiC—Al$_2$O$_3$ ceramic which had a spherical surface of R30.

Figure 6:
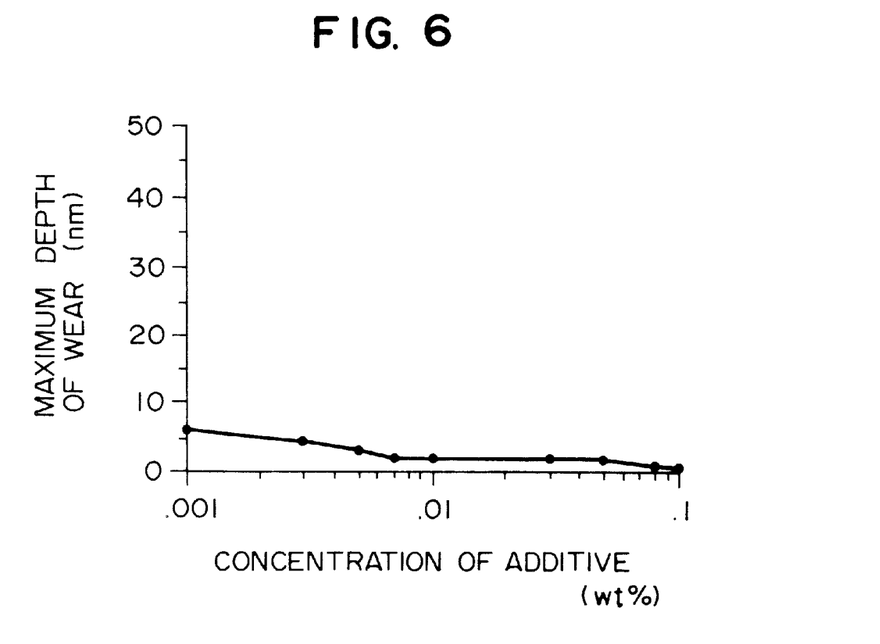
FIG. 6 shows the results of a test for friction at each concentration of the phosphorus-containing extreme pressure agent added in Example 6 to a fluorine-containing solvent to which a fluoro compound was also added to adjust its concentration to 0.01 wt %.

Using the thus obtained base plate 6 and spherical slide 6, the depth of wear of the disc was measured at the various concentrations of phosphorus-containing extreme pressure agent (VIII) added with the same tester under the same test conditions as described in Example 1. The results are shown in FIG. 6. As in Example 4, the reducing effect of the addition of the phosphorus-containing extreme pressure agent on the depth of wear was confirmed.

Example 7

Solutions (f) were prepared by dissolving a fluoro compound (IX) and oiliness agent (X) which are represented by the structural formulas shown below, in a perfluoro carbon type solvent (FC 75, a trade name, Sumitomo 3M Ltd.) to a concentration by weight of 0.01 wt % and various concentrations by weight of 0.001 to 0.1 wt %, respectively.

Fluoro compound (IX):

Oiliness agent (X):

Then, magnetic disc base plate 7 was obtained by forming a Ni—P layer, a Cr layer, a Co—Cr—Pt magnetic layer of 40 nm and a carbon sputtered layer of 30 nm in that order on the surface of a glass disc of 1.3 inches.

In addition, there was obtained spherical slide 7 made of TiC—Al$_2$O$_3$ ceramic which had a spherical surface of R30.

Figure 7:
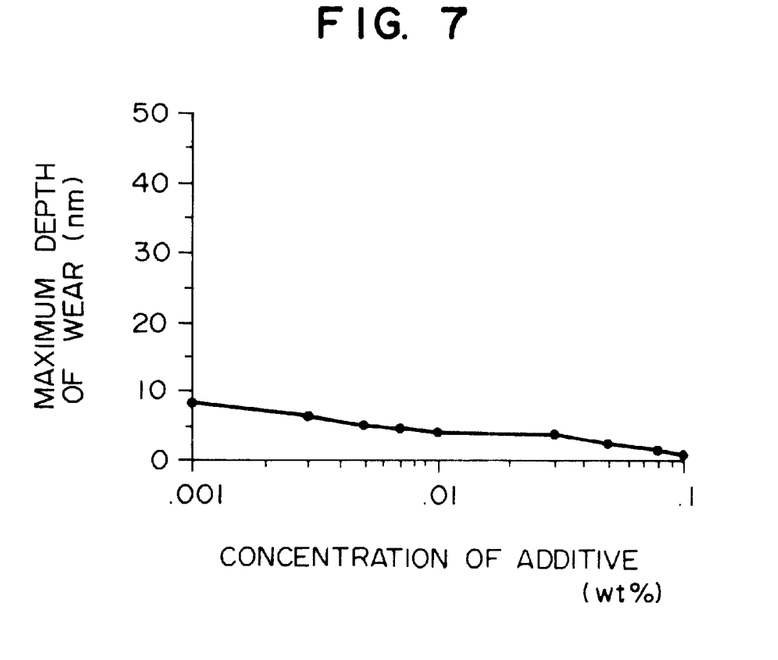
FIG. 7 shows the results of a test for friction at each concentration of the oiliness agent added in Example 7 to a fluorine-containing solvent to which a fluoro compound was also added to adjust its concentration to 0.01 wt %.

Using the thus obtained base plate 7 and spherical slide 7, the depth of wear of the disc was measured at the various concentrations of the oiliness agent (X) added with the same tester under the same test conditions as described in Example 1. The results are shown in FIG. 7. It was confirmed that in the present example in which the oiliness agent was added, the depth of wear is smaller than in Comparative Example 2.

Example 8

Solutions (g) were prepared by dissolving fluoro compound (XI) and oiliness agent (XII) which are represented by the structural formulas shown below, in a perfluorocarbon type solvent (FC 75, a trade name, Sumitomo 3M Ltd.) to a concentration by weight of 0.05 wt % and various concentrations by weight of 0.001 to 0.1 wt %, respectively.

Fluoro compound (XI):

Oiliness agent (XII):

Then, magnetic disc base plate 8 was obtained by forming a Ni—P layer, a Cr layer, a Co—Cr—Pt magnetic layer of 40 nm and a carbon sputtered layer of 30 nm in that order on the surface of an Al alloy disc of 1.3 inches.

In addition, there was obtained spherical slide 8 made of TiC—Al$_2$O$_3$ ceramic which had a spherical surface of R30.

Figure 8:
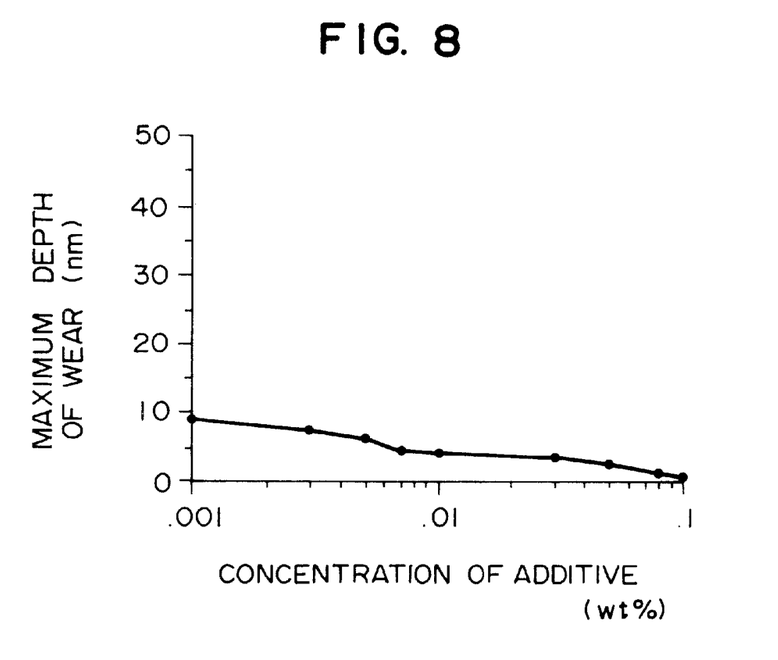
FIG. 8 shows the results of a test for friction at each concentration of the oiliness agent added in Example 8 to a fluorine-containing solvent to which a fluoro compound was also added to adjust its concentration to 0.05 wt %.

Using the thus obtained base plate 8 and spherical slide 8, the depth of wear of the disc was measured at the various concentrations of the oiliness agent (XII) added with the same tester under the same test conditions as described in Example 1. The results are shown in FIG. 8. The same effect as described in Example 7 was confirmed.

Comparative Example 1

Using the sliding tester (FIG. 1) used in Examples 1 to 8, the depth of wear in the case of using a perfluorocarbon type solvent (FC 75, a trade name, Mitsui Fluoro Chemical Ltd.) alone was measured. The result is shown in Table 1.

Comparative Example 2

Solutions (h) were prepared by dissolving nonpolar fluorocarbon oil (XIII) of the following structural formula in a perfluorocarbon type solvent (FC 72, a trade name, Sumitomo 3M Ltd.) to various concentrations by weight of 0.001 to 0.1 wt %.

Figure 9:
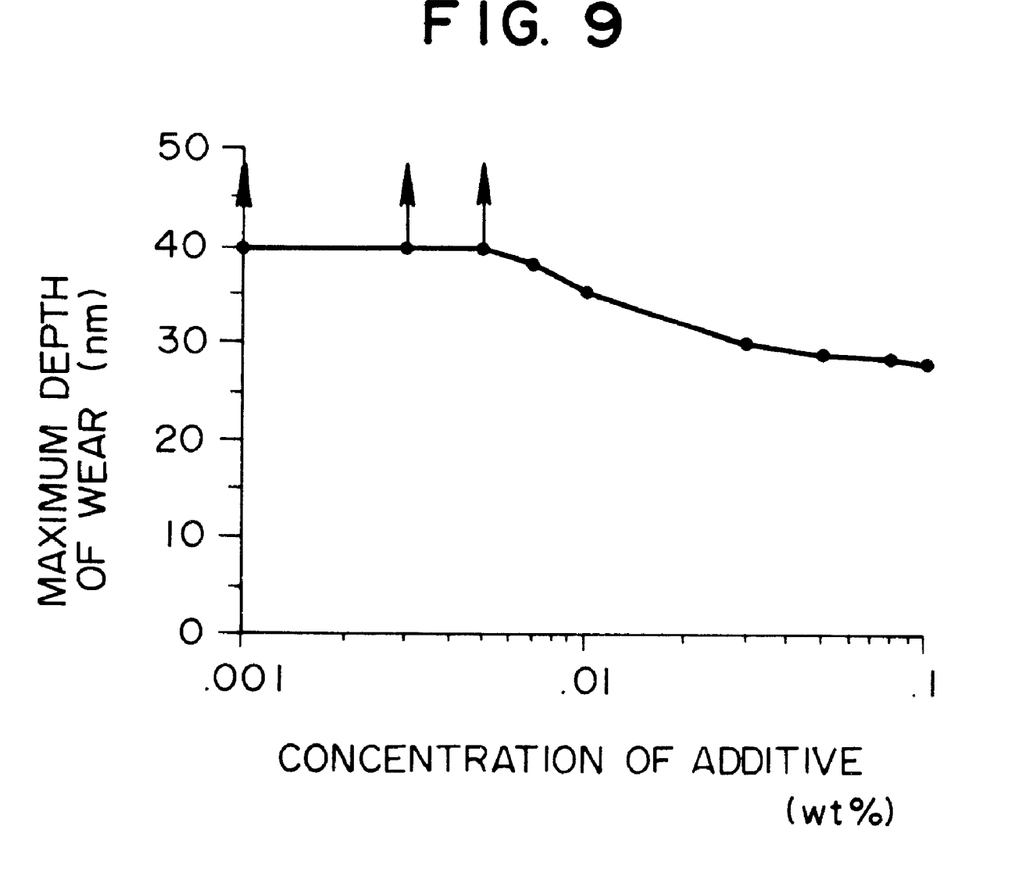
FIG. 9 shows the results of a test for friction at each concentration of the nonpolar fluorocarbon oil added in Comparative Example 2 to a fluorine-containing solvent.

Fluoro compound (XIII):

Then, the depth of wear of a disc was measured at the various concentrations of nonpolar fluorocarbon oil (XIII) added with the same tester under the same test conditions as described in Example 1 to 8. The results are shown in FIG. 9.

The result of Comparative Example 1 indicates that in the case of a lubricating film composed of the fluorine-containing solvent alone, the depth of wear was clearly larger than in the cases of addition of a fluoro compound and/or an extreme pressure agent or an oiliness agent, resulting in crush of a disc. From the result of Comparative Example 2, it was found that in Comparative Example 2 in which the nonpolar fluorocarbon oil incapable of being adsorbed on the surface was used, the depth of wear was larger than in the present example in which the fluoro compound capable of being easily adsorbed on the surface was used. That is, this fact means that no reliability on sliding can be assured unless a fluoro compound which has a fluorine-free portion for easy adsorption on the surface and is highly effective in coating sliding portions sufficiently, is chosen as fluoro compound to be added to a solution to be continuously supplied. In addition, it can be said that when added in the form of a solution, a mixture of a fluoro compound and an extreme pressure agent or an oiliness agent is more effective in imparting wear resistance than any of a fluoro compound, an extreme pressure agent and an oliliness agent.

The above results have proved that the present invention is very effective as a lubricating layer for magnetic recording media which are subjected to severe sliding at a very slightly kept-off or completely contacted state.

By continuous supply of a liquid lubricant prepared by adding a fluoro compound and an extreme pressure agent or an oiliness agent to a solvent to the surface of a disc, the present invention can realize negligible friction and wear resistance in severe sliding at a very slightly kept-off or completely contacted state, and the present invention can provide a magnetic recording reproducer having excellent sliding-resistant characteristics.

What is claimed is:

1. A magnetic recording disc, comprising:
   a non-magnetic substrate;
   a magnetic layer provided over said non-magnetic substrate;
   a protective layer provided over said magnetic layer; and
   a lubricating film provided on said protective layer, said lubricating film being formed by continuous supply of a lubricant, said lubricant comprising a low-viscosity solvent having a viscosity in the range of 10 to 0.01 cSt and at least one of a fluoro compound, an extreme pressure agent and an oiliness agent dissolved therein, from an axis of rotation of the magnetic recording disc by centrifugal force.

2. A magnetic recording disc according to claim 1, wherein said lubricant includes a fluoro compound which comprises a fluorine-containing portion and a fluorine-free portion.

3. A magnetic recording disc according to claim 2, wherein said lubricant further includes an extreme pressure agent or an oiliness agent dissolved in said low-viscosity solvent.

4. A magnetic recording disc according to claim 2, wherein said fluorine-containing portion contains a perfluoropolyoxyalkyl group or a perfluoro-polyoxyalkylene group.

5. A magnetic recording disc according to claim 1, 2 or 4, wherein said lubricant includes said extreme pressure agent, and said extreme pressure agent is selected from the group consisting of:

(1)

(2)

(3)

(4)

wherein R is a hydrocarbon group.

6. A magnetic recording disc according to claim 1, 2 or 4, wherein said lubricant includes said oiliness agent, and said oiliness agent is selected from the group consisting of:

and wherein each of n and m is an integer of 1 to 30, respectively.

7. A magnetic recording disc according to claim 1, wherein said at least one of a fluoro compound, an extreme pressure agent and an oiliness agent is contained in said lubricant at a concentration of 0.001 wt. % or more.

8. A magnetic recording disc according to claim 1, wherein said at least one of a fluoro compound, an extreme pressure agent and an oiliness agent is contained in said lubricant at a concentration of 0.003 wt. % or more.

9. A magnetic recording disc according to claim 1, wherein said at least one of a fluoro compound, an extreme pressure agent and an oiliness agent is contained in said lubricant at a concentration of 0.007 wt. % or more.

10. A magnetic recording disc according to claim 1, wherein said low viscosity solvent has a viscosity of 0.01 cSt to less than 1 cSt.

11. A magnetic recording disc according to claim 10, wherein said low viscosity solvent is a fluorocarbon solvent.

12. A magnetic recording disc according to claim 1, wherein said low viscosity solvent is a fluorocarbon solvent.

13. A magnetic recording reproducer comprising:

a magnetic recording disc comprising a non-magnetic substrate, a magnetic layer provided over said substrate, a protective layer provided over said magnetic layer, and a lubricating film provided on said protective layer;

a spindle for rotating said magnetic recording disc, said spindle including supply means for continuously supplying a lubricant to a surface of said protective layer by centrifugal force to form said lubricating film, said lubricant comprising a low-viscosity solvent having a viscosity of 10 to 0.01 cSt and at least one of a fluoro compound, an extreme pressure agent and an oiliness agent dissolved therein, said supply means including a source of said lubricant; and a magnetic head.

14. A magnetic recording reproducer according to claim 13, wherein said lubricant includes a fluoro compound which comprises a fluorine-containing portion and a fluorine-free portion.

15. A magnetic recording reproducer according to claim 14, wherein said lubricant further includes an extreme pressure agent or an oiliness agent dissolved in said low-viscosity solvent.

16. A magnetic recording reproducer according to claim 14, wherein said fluorine-containing portion contains a perfluoropolyoxyalkyl group or a perfluoro-polyoxyalkylene group.

17. A magnetic recording reproducer according to claim 13, 14 or 16, wherein said lubricant includes said extreme pressure agent, and said extreme pressure agent is selected from the group consisting of:

(1)

(2)

(3)

(4)

wherein R is a hydrocarbon group.

18. A magnetic recording reproducer according to claim 13, 14 or 16, wherein said lubricant includes said oiliness agent, and said oiliness agent is selected from the group consisting of:

and wherein each of n and m is an integer of 1 to 30, respectively.

19. A magnetic recording reproducer according to claim 13, wherein said at least one of a fluoro compound, an extreme pressure agent and an oiliness agent is contained in said lubricant at a concentration of 0.001 wt. % or more.

20. A magnetic recording reproducer according to claim 13, wherein said at least one of a fluoro compound, an extreme pressure agent and an oiliness agent is contained in said lubricant at a concentration of 0.003 wt. % or more.

21. A magnetic recording reproducer according to claim 13, wherein said at least one of a fluoro compound, an extreme pressure agent and an oiliness agent is contained in said lubricant at a concentration of 0.007 wt. % or more.

22. A magnetic recording reproducer according to claim 13, wherein said low viscosity solvent has a viscosity of 0.01 cSt to less than 1 cSt.

23. A magnetic recording reproducer according to claim 22, wherein said low viscosity solvent is a fluorocarbon solvent.

24. A magnetic recording reproducer according to claim 13, wherein said low viscosity solvent is a fluorocarbon solvent.

25. A method for lubricating a surface of a magnetic recording disc comprising a non-magnetic substrate, a magnetic layer provided over the non-magnetic substrate and a protective layer provided over the magnetic layer, the method comprising:
    introducing a lubricant into a spindle on which the magnetic recording disc is provided, the lubricant comprising a low-viscosity solvent having a viscosity of 10 to 0.01 cSt and at least one of a fluoro compound, an extreme pressure agent and an oiliness agent dissolved therein;
    rotating the spindle and magnetic recording disc provided thereon; and
    continuously supplying the lubricant from the spindle to a surface of the protective layer by centrifugal force due to rotation of the spindle.

26. A method for lubricating a surface of a magnetic recording disc according to claim 25, wherein said lubricant includes a fluoro compound which comprises a fluorine-containing portion and a fluorine-free portion.

27. A method for lubricating a surface of a magnetic recording disc according to claim 26, wherein said lubricant further includes an extreme pressure agent or an oiliness agent dissolved in said low-viscosity solvent.

28. A method for lubricating a surface of a magnetic recording disc according to claim 26, wherein said fluorine-containing portion contains a perfluoropolyoxyalkyl group or a perfluoro-polyoxyalkylene group.

29. A method for lubricating a surface of a magnetic recording disc according to claim 25, 26 or 28, wherein said lubricant includes said extreme pressure agent, and said extreme pressure agent is selected from the group consisting of:

(1)

-continued (2)

(3)

(4)

wherein R is a hydrocarbon group.

30. A method for lubricating a surface of a magnetic recording disc according to claim 25, 26 or 28, wherein said lubricant includes said oiliness agent, and said oiliness agent is selected from the group consisting of:

and wherein each of n and m is an integer of 1 to 30, respectively.

31. A method for lubricating a surface of a magnetic recording disc according to claim 25, wherein said at least one of a fluoro compound, an extreme pressure agent and an oiliness agent is contained in said lubricant at a concentration of 0.001 wt. % or more.

32. A method for lubricating a surface of a magnetic recording disc according to claim 25, wherein said at least one of a fluoro compound, an extreme pressure agent and an oiliness agent is contained in said lubricant at a concentration of 0.003 wt. % or more.

33. A method for lubricating a surface of a magnetic recording disc according to claim 25, wherein said at least one of a fluoro compound, an extreme pressure agent and an oiliness agent is contained in said lubricant at a concentration of 0.007 wt. % or more.

34. A method for lubricating a magnetic recording disc according to claim 25, wherein said low-viscosity solvent has a viscosity of 0.01 cSt to less than 1 cSt.

35. A method for lubricating a magnetic recording disc according to claim 34, wherein said low-viscosity solvent is a fluorocarbon solvent.

36. A method for lubricating a magnetic recording disc according to claim 25, wherein said low-viscosity solvent is a fluorocarbon solvent.

* * * * *